(No Model.)

C. L. CARMAN.
BEARING FOR GYRATORY SHAFTS OR OTHER ANALOGOUS MECHANISM.

No. 525,404. Patented Sept. 4, 1894.

UNITED STATES PATENT OFFICE.

CHARLES L. CARMAN, OF CHICAGO, ILLINOIS, ASSIGNOR TO THE GATES IRON WORKS, OF SAME PLACE.

BEARING FOR GYRATORY SHAFTS OR OTHER ANALOGOUS MECHANISM.

SPECIFICATION forming part of Letters Patent No. 525,404, dated September 4, 1894.

Application filed November 9, 1893. Serial No. 490,446. (No model.)

*To all whom it may concern:*

Be it known that I, CHARLES L. CARMAN, a citizen of the United States, residing at Chicago, in the county of Cook and State of Illinois, have invented certain new and useful Improvements in Bearings for Gyrating Shafts or other Analogous Mechanism; and I do hereby declare the following to be a full, clear, and exact description of the invention, such as will enable others skilled in the art to which it appertains to make and use the same.

My invention relates to improvements in supporting bearings applicable to the gyrating shafts of gyratory stone breakers or crushers, or other analogous gyrating devices; and its object is to provide a supporting bearing for the shaft or other device which will allow of the same freely gyrating, and with very little friction, and at the same time will give the strength and area of bearing surface required to sustain the great strain brought to bear upon said shaft, or similar device, and consequently upon its supporting bearing, when the machine to which it is applied is in operation.

My invention will be more fully understood by reference to the following specification and claims and the accompanying drawings, in which latter—

Figure 1:
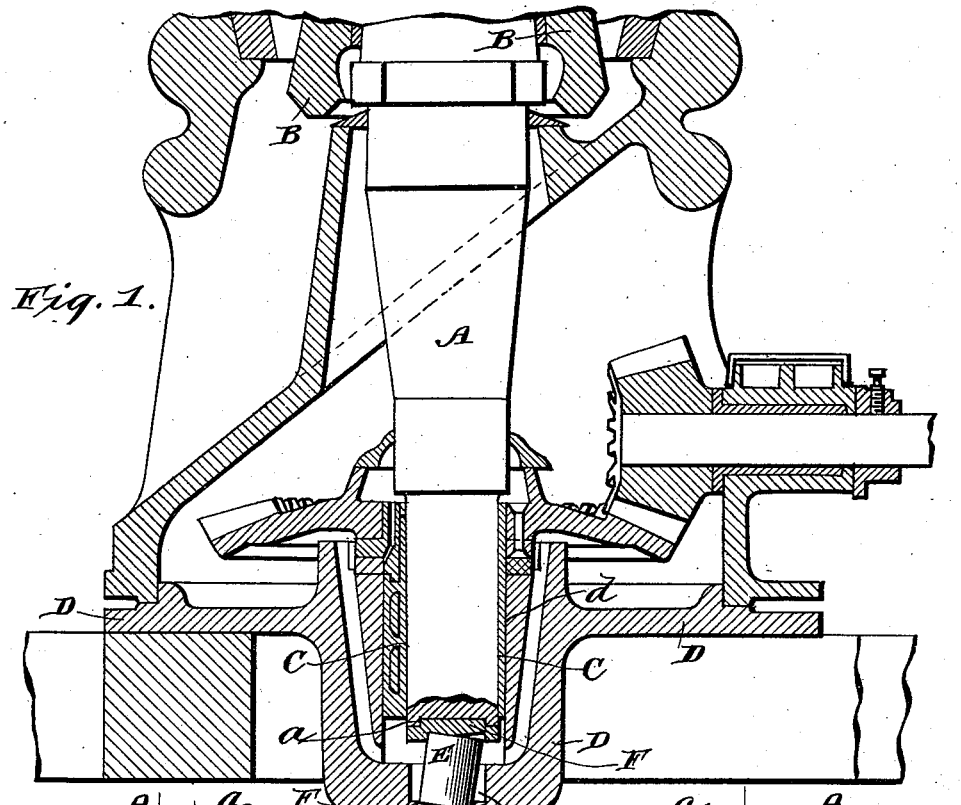
Figures 2, 3:
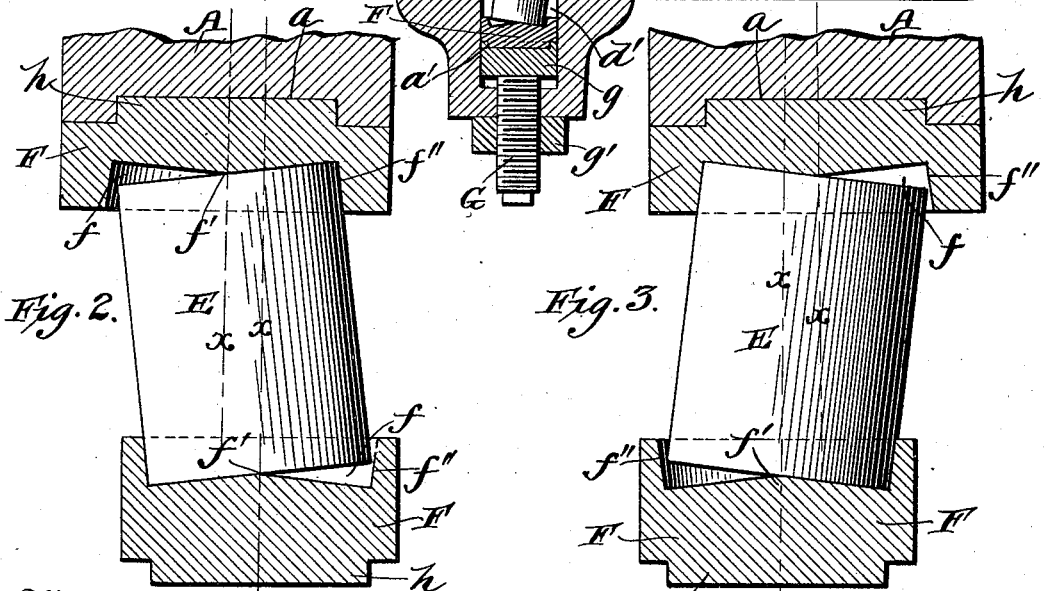

Figure 1. represents a central vertical section through a known type of gyratory stone crusher with my improved supporting bearing applied thereto. Fig. 2. represents a detail central vertical section of my improved bearing, showing the position of the gyrating columnar bearing block, when the gyrating shaft is in the extreme left position, and Fig. 3. represents the same, when the gyrating shaft is in the extreme right position.

A in the drawings is the gyrating shaft of a known type of gyratory stone crusher. This shaft carries a crusher head B and receives its gyratory movement by means of an eccentric bearing box C within which its lower end is mounted. This bearing box is mounted in a recess $d$ of the bottom plate D of the casing. The shaft is supported at its lower end by my improved supporting bearing which consists principally of a gyrating columnar bearing block E engaging recesses or valleys $f, f,$ formed in the bearing plates F, F, which are mounted respectively in the end of the gyrating shaft and the lighter screw block $g;$ said plates being provided with extensions $h, h,$ which are adapted to engage said shaft and lighter screw block, and thereby hold said plates in place. The said plates are also each provided, as before mentioned, with an annular valley, formed therein by recessing them in the peculiar manner shown, the bottom of said recess being inclined downward, in the lower plate, from a central apex $f'$, to the side walls $f''$, the inner face of said side walls being tapered, to flare outward toward the bottom of the upper block and the top of the lower block if desired, so as to form a coinciding bearing surface for the block E when it comes in contact therewith in its gyrations caused by said shaft. This flaring construction of the inner face of the walls however, is not essential, and may be omitted if desired, the walls being made vertical and room allowed to permit the block E to gyrate.

The columnar block E as shown is simply a cylindrical or columnar block of chilled steel or like hard metal, and has its ends cut squarely off or at right angles to its length, these ends being adapted to bear respectively within the bearing plates F, F. One of these plates is attached to the end of the shaft A by means of its extension $h$ which enters a coinciding recess $a$ in said shaft, and the other plate enters a similar recess $a'$ formed in the lighter screw block, which block is supported and adjusted in the recessed bottom plate of the frame by means of the lighter screw G and its locking nut $g'$, said screw engaging the under side of said block. This block $g$ and the lower bearing plate F are mounted in a recess $d'$, which prevents any lateral movement of the same but the upper bearing plate F moves with the shaft in its gyrations caused by the eccentric bearing box, the block E being interposed between the two bearing plates, and thus supporting the shaft but allowing its free gyration, the said block E rocking with a gyratory movement in the valleys $f.$ It can be seen by reference to the drawings—Figs. 2 and 3, that at any time during the gyrations of the shaft, the bearing surface of the block E in the lower plate or seat F is diametrically opposite the bearing surface, of the upper plate or seat F, then in contact with the columnar block E, and the apex $f'$ of the upper seat F is at no time directly above the apex of the lower seat (see lines $x$—$x$) so that there is always, no matter what the position of the shaft may be, a narrow portion of the bearing surfaces in contact, in the respective upper and lower seats, in a direct vertical line, so that any downward thrust is fully supported, and at the same time it will be seen, by reference to Fig. 1., that the pressure the gyrating shaft is exerting to the left, in consequence of the position there shown, will be met and resisted in a line with said pressure as said shaft is supported, when in this position, by the block E inclined to the right, and engaging the surface in the shaft seat which is inclined in the same direction. The block E does not revolve relatively to the seats in which it is mounted but simply rocks with a gyratory movement therein, as before explained. The plates F, F are exactly alike in structure, so the description of the one answers for the description of the other.

What I claim as my invention is—

1. Supporting bearing blocks for gyrating mechanism, consisting of channel-seats having inclined contact surfaces which respectively terminate in a central apex, and a columnar block having flat ends which are at a right angle to its vertical axis, and applied in said seats so that it can rock with a gyratory movement about the apices of said seats, and in rocking shall have a flat bearing contact with the respective blocks, substantially as described.

2. In a gyrating stone crusher, the combination with a frame, and a gyrating shaft carrying a crusher head, of mechanism for gyrating said shaft, and a supporting bearing for said shaft, consisting of a gyrating columnar block having flat ends which are at a right angle to its vertical axis, and channel-seats having bottoms with inclines which terminate respectively in a central apex, said seats serving for the columnar block to bear against while gyrating, substantially as described.

3. In a gyrating stone crusher, the combination of a frame and a gyrating shaft carrying a crusher head, of mechanism for gyrating said shaft, bearing seats mounted in said frame and shaft, respectively, and consisting of plates having recesses with surfaces inclined respectively downward and outward and upward and outward from central apexes, and a columnar block adapted to be fitted in said seats, substantially as described.

4. In a gyratory stone crusher, the combination with a frame and gyrating shaft carrying a crusher head, of mechanism for gyrating said shaft, a support for said shaft consisting of a gyrating columnar block having its ends cut at right angles to its length, and conical seats having inclined surfaces on which are mounted the ends of said columnar block; and a lighter screw for adjusting one of said seats, substantially as described.

In testimony whereof I hereunto affix my signature in presence of two witnesses.

CHARLES L. CARMAN.

Witnesses:
A. J. GATES,
P. W. GATES.